United States Patent Office 3,365,644
Patented Jan. 23, 1968

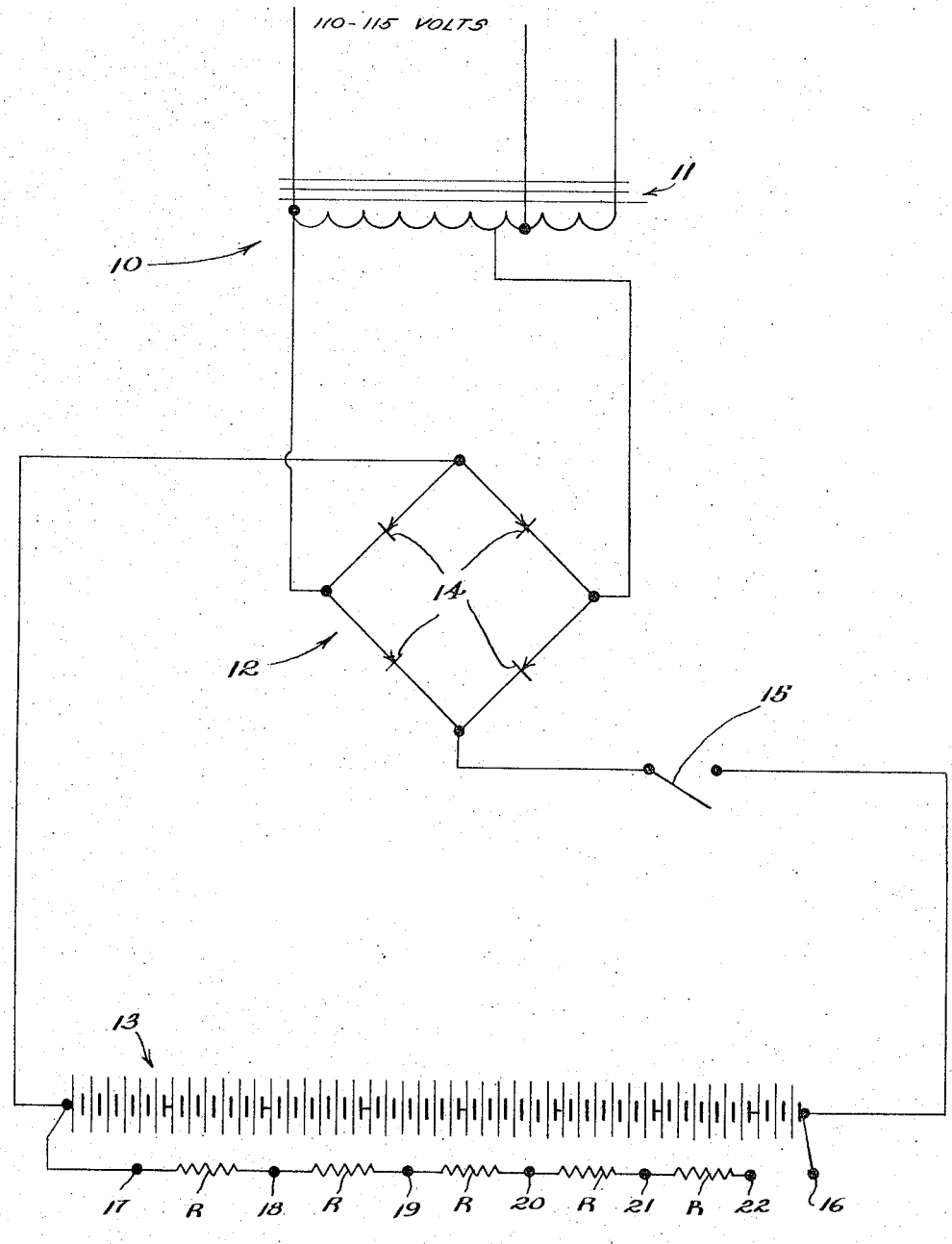

3,365,644
BATTERY POWERED STUD WELDER
Richard Allen Smallman, Griffith, Ind., assignor to Lift Trucks Incorporated of Illinois, Chicago, Ill., a corporation of Illinois
Filed June 4, 1964, Ser. No. 372,647
3 Claims. (Cl. 320—14)

This invention relates generally to stud welding, and more specifically to an improved power supply for this purpose, and its operation.

Stud welding is known in the art, and briefly stated comprises a process by which a metal stud is electrically welded to a metal plate. The element to be attached by welding is secured in a stud-welding gun of a known type which is connected to an appropriate power supply. The operator then manually moves the gun so that the stud held by it contacts the metal plate, which is connected to the opposite terminal of the power supply. When so engaged, a circuit is closed from the power supply through the gun and stud, and through the plate, back to the power supply. After a moment of engagement, the operator triggers the gun to effect spacing of the stud slightly from the plate. This movement draws an arc between the stud and the plate, such arc being automatically extinguished by timing means connected to the gun. By the time the arc is extinguished, both the end of the stud and the plate are extremely hot, so that after the arc has been extinguished, the operator may move the stud into engagement with the plate after which molten material quickly sets to form a rigid connection. It is customary to employ a flux such as thermite on the stud, which flux is melted by the arc to facilitate the making of a sound joint.

In this type of a welding operation, a relatively low-voltage high-amperage direct current is provided by the power supply.

It has been customary to employ power supplies of rather substantial size and weight for this purpose. By way of example, one such power supply comprises a 1200-ampere generator driven by a 3-phase 440-volt motor. An alternative has been to employ two 800-ampere generators in parallel, the added combined rating being necessary due to impedance typically encountered. From a performance standpoint, one of the most satisfactory power supplies used previously has been a DC-generator having a 2000-ampere rating at 85 volts DC, driven by a 200-horsepower diesel engine. Unsuccessful attempts have also been made to provide a power supply employing a battery and rectifier combination. Such attempts have been partially operative but generally unsatisfactory, since the best results which have been obtained have necessarily been limited to the smaller sizes of studs welded, and to unsatisfactorily low production rates, that is to an inadequate or uneconomic number of welds produced per day.

Further, as can be expected from the figures given above, power supplies heretofore used have been heavy, bulky, and have cost from a few thousand dollars to over $10,000.00.

The present invention comprises a method and means for providing stud-welding power of a magnitude sufficient to enable substantially continuous stud-welding, and employing apparatus of a size, cost, and weight of only a fraction of that of the prior known power supplies. I have found that a rectifier-battery type of power supply may be used for this purpose if a critical recovery-maintenance voltage is employed, particularly in combination with a battery having certain charging and discharging properties.

Accordingly, it is an object of the present invention to provide an improved power supply and method of operating the same for stud-welding.

Another object of the present invention is to provide a stud-welding power supply of smaller size, of lesser weight, of lesser bulk, of lesser cost, and of as good or better welding capacity than that heretofore used for such purpose.

Many other advantages, features and additional objects of the present invention will become manifest to those versed in the art upon making reference to the detailed description and to the accompanying drawing sheet in which a preferred structural embodiment incorporating the principles of the present invention is shown by way of illustrative example.

On the drawing:

The single figure is a schematic drawing of a stud-welding power supply provided in accordance with the principles of the present invention.

As shown on the drawing:

The principles of this invention are particularly useful when embodied in a method and means for stud-welding, such as the power supply illustrated in the figure, generally indicated by the numeral 10. The illustrated preferred embodiment of power supply 10 includes an auto-transformer 11, adapted to be connected to a suitable source of alternating current, and to energize a full-wave rectifier 12, which in turn is connected to a series of batteries generally indicated at 13.

The auto-transformer 11 in conventional, and one having a 28-ampere rating at 110 volts is adequate when employed with other components having values described herein. Larger units may be employed if higher current is required. However, the present side is ideal for general purpose use since the same can be plugged into many non-special power outlets.

The full-wave rectifier 12 comprises a number of individual rectifiers 14, connected together as shown to make up a full-wave rectification bridge. Individual rectifiers having 50-ampere ratings at 110 volts AC are suitable at this point in the circuit.

The full-wave bridge 12 is connected through an optionally provided switch 15 to the batteries 13.

The battery means 13 comprises a group of seven and one-half 12-volt batteries connected in series, each being of the lead-acid type and totaling at least 42 and preferably 45 cells.

Connected to the battery 13 is a terminal 16 from which a connection is normally made to the plate to which the stud is to be welded. Connected to the other side of the battery 13 is a further terminal 17 which is adapted to be connected to the stud to be welded, such connection passing through the stud-holding and current-timing gun. In the example given herein, the terminal 17 is adequate for welding studs of a ⅞ inch diameter. A series of further terminals 18–22 are also provided, each spaced from each other by suitable resistances R. Correction may be made from any of the terminals 18–22 to the stud-holding gun for the welding of progressively smaller stud sizes. Each of the resistances R has a 2000-ampere rating, preferably comprises stainless steel, and has a resistance determined by the size of the stud to be welded.

The battery 13 comprises 45 lead-acid cells, each having a nominal 2-volt rating. In practice, the battery 13 may be provided by connecting a group of seven and one-half 12-volt batteries in series as illustrated.

One of the main features of my invention is that I have discovered that the magnitude of the voltage applied to the battery 13 is extremely critical. It is at this point that others have failed in that one of the apparently inevitable results occurs. By way of example, prior workers in the field have applied such a total potential that the potential per cell was 2.15 volts for the purpose of maintaining the charge thereof, such potential coming from a charger which periodically, or whenever needed, applies a potential of 2.30 volts per cell, either by open-loop control, or until the original charge has been recovered. However, with such potentials applied thereto, either over or undercharging occurs, depending upon the extent of usage. Moreover, such power supply has not been practicable for stud sizes over ½ inch, since the same can either not be welded or cannot be welded at an economic rate of welds.

However, I have found that if such pulsating DC-potential is applied to the battery 13 that each cell thereof will have a potential between 2.17 and 2.19 volts applied thereto, neither under or overcharging occurs. Owing to minute manufacturing differences between successive cells, no two cells will have precisely the same potential thereacross. However, the relatively narrow range of 2.17 to 2.19 volts is ample to accommodate such variations. This range of voltage values is critical, overcharging having been observed when a voltage of 2.20 was employed, and lack of adequate recovery or undercharging having been observed when the potential was 2.16 volts per cell. The voltage range of 2.17 to 2.19, in accordance with my invention, is left on or is applied continually. Thus, this voltage range is employed both for maintenance of the charge on the battery 13 when it is not in use as well as for recovery of the charge needed as a result of usage. The application of a substantially constant voltage continually serves to maintain a specific gravity in the range of 1260–1285. Once this specific gravity range is maintained, it becomes possible to weld studs up to ⅞ inch, the largest that I have so far attempted to weld. Yet this size of studs can be welded steadily, since the power supply will recover the specified charge within the time that it takes the welder or operator to go through one cycle of steps representing the welding of one stud.

The purpose of the auto-transformer 11 is to adjust the input potential to the rectifier bridge so that the input potential across each battery cell will be within the range of 2.17–2.19 volts. Any other substantially constant source of potential to the bridge would suffice, providing that the specified bridge output is continually maintained across the cells.

It is emphasized that the present method and means thus applies a substantially constant input current to the battery 13, that the power supply employs no sensing device to determine the level of the charge, and no periodic switching device for applying charging potential intermittently.

In the welding of ⅝ inch studs, welding current flows for about %₀ second, with the rate of production being limited by the capacity of the operator. In welding ⅞ inch studs, the welding current flows for about 1⅓ seconds, the power supply being able to maintain its charge where up to 8 to 12 such welds are made every minute. This rate for all practical purposes constitutes continuous usage, as the operator cannot labor faster.

A further important aspect of the present invention is the selection of the battery 13. To obtain the foregoing operation, it is necessary that a battery 13 be employed which has the ability to pass the requisite high currents, and to absorb rapidly the recovery charge.

For convenience, reference is made herein to the battery classifications and ratings as established by the Society of automotive Engineers, as published in the SAE Handbook, 1961 edition, at page 634. Of the 49 battery classifications specified therein, only SAE No. 4D, 6D, and 8D are suitable to practice my invention. Seven 4D batteries suffice, and therefore are preferred. The illustrated example includes power supply values presuming the use of the 4D battery. If the 6D battery or the 8D battery were employed, a higher current capacity bridge would be needed to maintain the 2.17–2.19 voltage range specified. These batteries are characterized in that each has a tentative charge acceptance rating of at least 15 amperes, and in addition thereto, has a high-rate-of-discharge-for-30-seconds rating which is no less than 9.3 volts. The 4D size is the smallest of the three sizes and is the least expensive of these sizes, and the needed seven and one-half of such batteries can presently be procured for approximately $560.00 at retail. Thus, it is evident that with the addition of the auto-transformer and full-wave rectifier, etc., the power supply herein described can be made or procured for a small fraction of that heretofore required for a power supply of equivalent performance. The battery ratings specified are those which are obtained as a result of tests conducted in accordance with the procedures set forth in the SAE standard, which test conditions, for present purposes, are purely arbitrary, but serve as a convenient yardstick. Batteries of the specified type employ a relatively large amount of electrolyte, and the cell plates are relatively loosely spaced to obtain the high charge acceptance rating specified. The plates are of relatively large size to obtain the high discharge rating specified. Thus, a loosely packed battery having a large volume of electrolyte which can circulate freely and having a charge thereon in which the electrolyte has a specific gravity of at least 1260, maintained by a constant current having a potential in the range of 2.17 to 2.19 volts, comprises an economic, simple, and reliable power supply for stud welding.

Although various minor modifications might be suggested by those versed in the art, it should be understood that I wish to embody within the scope of the patent warranted hereon all such embodiments as reasonably and properly come within the scope of my contribution to the art.

I claim as my invention:

1. Apparatus for stud-welding comprising in combination:
    (a) a number of lead-acid cell batteries continually connected together in series, and each having a "tentative charge acceptance" rating of at least 15 amperes, and a "high rate of discharge for 30 seconds" rating of at least 9.3 volts;
    (b) means connected to said series of batteries and operative to apply continuously to each cell a DC-potential in the range of 2.17 to 2.19 volts; and
    (c) terminal means connected to said batteries for connection to a stud-holding and current-timing gun.

2. Apparatus for stud-welding according to claim 1, in which said number of batteries comprises at least seven 12-volt lead-acid cell batteries.

3. Apparatus for stud-welding according to claim 2, in which said number of batteries comprises seven and one-half of said batteries.

References Cited
UNITED STATES PATENTS

| | | | |
|---|---|---|---|
| 2,510,620 | 6/1950 | Craven | 219—4 |
| 2,622,176 | 12/1952 | Butterfield | 219—4 |
| 1,183,264 | 5/1916 | Woodrow | 219—108 |
| 1,967,801 | 7/1934 | Woodbridge | 320—59 X |
| 2,869,064 | 1/1959 | Portail | 320—59 X |
| 2,980,842 | 4/1961 | Medlar | 320—15 X |
| 2,987,663 | 6/1961 | Medlar | 320—38 |
| 3,210,727 | 10/1965 | McLaughlin et al. | 340—52 |
| 3,217,228 | 11/1965 | Jardine | 320—57 X |

JOHN F. COUCH, *Primary Examiner.*

S. WEINBERG, *Assistant Examiner.*